US006876852B1

United States Patent
Li et al.

(10) Patent No.: US 6,876,852 B1
(45) Date of Patent: Apr. 5, 2005

(54) INTEGRATED CABLE AND CELLULAR NETWORK

(75) Inventors: Chia-Chang Li, Holmdel, NJ (US); Krishnamurthy Raghunandan, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/521,791

(22) Filed: Mar. 9, 2000

(51) Int. Cl.[7] ................................ H04Q 7/20
(52) U.S. Cl. ................ 455/426.2; 455/554.1; 455/554.2; 455/426.1
(58) Field of Search ................ 455/422–466, 455/555, 554.1, 554.2, 517, 575.1, 550.1, 403, 561, 556.1, 553.1, 402, 414, 562; 370/486, 80, 485, 870.02, 342, 395.5, 466, 487, 497, 345, 463, 405, 281, 464, 400, 490; 379/324, 56.1, 167.01, 220.1, 56, 58, 59; 725/106, 108, 119, 26

(56) References Cited

U.S. PATENT DOCUMENTS

| | | | | |
|---|---|---|---|---|
| 5,675,629 A | * | 10/1997 | Raffel et al. | 379/58 |
| 5,761,619 A | * | 6/1998 | Danne et al. | 455/422 |
| 5,809,395 A | * | 9/1998 | Hamilton-Piercy et al. | 455/4.1 |
| 5,867,485 A | * | 2/1999 | Chambers et al. | 370/281 |
| 5,890,055 A | * | 3/1999 | Chu et al. | 455/16 |
| 2002/0033416 A1 | * | 3/2002 | Gerszberg et al. | 235/380 |

* cited by examiner

Primary Examiner—Edward F. Urban
Assistant Examiner—Charles Chow

(57) ABSTRACT

A system and method that provides seamless mobility through cable and wireless (e.g. cellular) communication networks to allow users to use a single mobile phone everywhere. The system takes advantage of a variety of features of cellular or wireless systems residential systems, cellular or wireless distribution networks, mobile switching centers, and cable networks. Users access services according to the present invention through a combined wireless-wired infrastructure in the residence connected to wireless communication networks.

20 Claims, 14 Drawing Sheets

FIG. 4(b)

HLR (HOME LOCATION REGISTER) – USER DATABASE

| PUBLIC NETWORK FUNCTION | PRIVATE NETWORK FUNCTION | RESIDENTIAL NETWORK FUNCTION | ACCEPTABLE COMBINATIONS | RESPONSIBLE NETWORK |
|---|---|---|---|---|
| SID(HOME SYSTEM ID)/ ESN<br><br>IF USING SIM CARD, A COMBINATION OF SIMID AND SID WILL BE VALID.<br><br>WAP DEVICES WILL USE A COMBINATION OF EIN AND IP. | PSID1<br>PSID2<br>PSID3<br>PSID4<br>PSID5<br><br>EACH PSID IS ASSOCIATED WITH THE SID OF THE SURROUNDING (CONNECTING) PUBLIC NETWORK. | RSID1 RSID2<br>RSID3<br>RSID4<br>RSID5<br><br>EACH RSID IS ASSOCIATED WITH THE SID OF THE SURROUNDING (CONNECTING) PUBLIC NETWORK. | MATCH/CONFIRM SID ONLY MATCH ANY ONE PSID AND PASS ON INFORMATION ABOUT THE SURROUNDING PUBLIC NETWORK<br><br>MATCH ANY ONE RSID AND SEND INFORMATION ABOUT THE SURROUNDING PUBLIC NETWORK | PUBLIC NETWORK. IF SID DOES NOT MATCH THEN CONTACT HOME BASE (USING SID PUT OUT BY HANDSET) TO CONFIRM AUTHORIZATION FOR USE. PRIVATE NETWORK – ALSO SEND THE SID OF THE SURROUNDING PUBLIC NETWORK<br><br>RESIDENTIAL NETWORK – ALSO SEND THE SID OF THE SURROUNDING PUBLIC NETWORK |

MSC (MOBILE SWITCHING CENTER) — 28

FIG. 4(c)

USER NAM – NETWORK ACCESS METHOD

HANDSET – USER PROFILE – NAM

| PUBLIC NETWORK INFORMATION | PRIVATE NAM | RESIDENTIAL NAM | LOGIC AND ALGORITHM |
|---|---|---|---|
| SID (HOME SYSTEM ID) – NUMBER CAN BE INSERTED ONLY BY SERVICE PROVIDER. ESN – THIS IS AN INTEGRAL PART OF THE HANDSET. THE SIM CARD USES SIMID WHICH IS AN INTEGRAL PART OF THE CARD, AND THE NAM FOR PRIVATE OF RESIDENTIAL. WAP DEVICE WILL HAVE AN EIN (INTEGRAL PART OF THE DEVICE) AND IP – INSERTED BY THE SERVICE PROVIDER. | PSID1 – NUMBER INSERTED BY THE BUSINESS PROVIDING THE PRIVATE NETWORK. PRIMARY WORK LOCATION OF THE USER. SIM CARD CAN HAVE ALL THE VALID PSID NUMBERS WITH PSID1 HAVING HIGHEST PRIORITY AND PSID5 HAVING LOWEST PRIORITY. PSID2 – NUMBER INSERTED BY THE BUSINESS PROVIDING THE PRIVATE NETWORK. SECONDARY WORK LOCATION OF THE USER. PSID3 PSID2 – NUMBER INSERTED BY THE BUSINESS PROVIDING THE PRIVATE NETWORK. OTHER VALID WORK LOCATION OF THE USER. PSID4 PSID2 – NUMBER INSERTED BY THE BUSINESS PROVIDING THE PRIVATE NETWORK. OTHER VALID WORK LOCATION OF THE USER. PSID5 PSID2 – NUMBER INSERTED BY THE BUSINESS PROVIDING THE PRIVATE NETWORK. OTHER VALID WORK LOCATION OF THE USER. | RSID1 – NUMBER INSERTED BY END USER OR BY SERVICE PROVIDER, FOR PRIMARY RESIDENCE ONLY. SIM CARD CAN HAVE ALL THE VALID RSID NUMBERS WITH RSID1 HAVING HIGHEST PRIORITY AND RSID5 HAVING LOWEST PRIORITY. RSID2 – NUMBER INSERTED BY END USER OR BY SERVICE PROVIDER, FOR SECONDARY RESIDENCE ONLY. RSID3 – NUMBER INSERTED BY END USER OR BY SERVICE PROVIDER, FOR PERMITTED RESIDENCES ONLY. RSID4 – NUMBER INSERTED BY END USER OR BY SERVICE PROVIDER, FOR PERMITTED RESIDENCES ONLY. RSID5 – NUMBER INSERTED BY END USER OR BY SERVICE PROVIDER, FOR PERMITTED RESIDENCES ONLY. | IF RSID1 IS AVAILABLE, REGISTER ONLY FROM RSID1, ALSO BROADCAST THE SURROUNDING SID (BUILT–IN FUNCTION). IF NO RSID MATCH OCCURS, SEARCH FOR PSID, THEN REGISTER USING PSID, INTIMATE SURROUNDING PSID (BUILT–IN FUNCTION). IF PSID DOES NOT MATCH, THEN SEARCH FOR PUBLIC SID. MATCH ANY ONE RSID AND PASS ON INFORMATION ABOUT THE SURROUNDING PUBLIC NETWORK. MATCH ANY ONE RSID AND SEND INFORMATION ABOUT THE SURROUNDING PUBLIC NETWORK |

INTEGRATED CABLE AND CELLULAR NETWORK

BACKGROUND OF THE INVENTION

This invention relates to an integrated cable and cellular network for telecommunications. More particularly, the invention is directed to systems and methods that provide seamless mobility through cable and wireless (e.g. cellular) communication networks to allow users to use a single mobile phone in all circumstances. The system takes advantage of a variety of features of cellular or wireless systems, residential systems, cellular or wireless distribution networks, mobile switching centers, and cable networks. Users access services according to the present invention through a combined wireless-wired infrastructure in the residence connected to wireless communication networks.

While the invention is particularly directed to the art of integrating cable and wireless technology for the purpose of establishing telephone service, and will be thus described with specific reference thereto, it will be appreciated that the invention may have usefulness in other fields and applications. For example, the invention may be used to establish a variety of telecommunication services beyond telephone service. Another example is the application of the invention on other access media other than cable, e.g., ADSL or asymmetrical digital subscriber line.

By way of background, many wireless telephone users presently make use of wireless telephones when they are in an automobile or otherwise away from their residence. In their homes, these users typically maintain the traditional "plain old telephone system (POTS)" service. As a result, the user must subscribe to more than one service, e.g. wireless service, local telephone service, and long distance service. It would therefore be desirable for these users to exclusively use only one phone service.

Until only recently, wireless telephone technology was not conducive to exclusive use for the vast majority of users. For example, for the first few years after introduction of the technology to the mass marketplace, wireless telephone batteries did not hold a charge for extended periods of time. Significantly, though, wireless telephones now have the capability of operating for a week or more without recharging. As such, wireless technology is becoming increasingly more conducive to exclusive use by users. However, a pnrmary difficulty that arises—particularly when a high volume of wireless telephone users use wireless telephone service exclusively in a limited geographic region—is that sufficient bandwidth is not available on the public wireless systems to accommodate such extensive use. Another deficiency of today's wireless networks is inadequate coverage in the residential areas. It happens often that users of mobile phones do not obtain a satisfactory signal level around their homes to receive and originate phone calls.

In addition, cable telephone systems have been suggested as alternative to POTS service. However, in cable systems, it is technically challenging to provide a significant feature of POTS—lifeline capability. That is, traditional telephone service is considered to be a lifeline to residences because power that is used to operate basic telephones in the residence is supplied through the central office of the telephone system. This manner of supplying power is feasible because power requirements of traditional telephones is minimal. So, even in the case of power outages in or to the residence, telephone service remains intact. Cable telephony systems, however, require a significantly greater amount of power to operate in the home. The power required is of a level that cannot be easily and economically supplied by the cable service provider as is the case with the central office. Thus, if the residence loses power, the cable system will not operate in that residence without a backup arrangement. A typical approach today is to use backup batteries in the residences to provide a few hours of operational time in the case of power outage. However, this approach adds significant cost and maintenance overhead. Therefore, it remains technically and economically challenging to offer lifeline services on cable telephony systems.

The present invention contemplates a unique integrated cable/cellular network that resolves the above-referenced difficulties and others.

SUMMARY OF THE INVENTION

This invention relates to an integrated cable and cellular network for telecommunications. More particularly, the invention is directed to a system and methods that provide seamless mobility through cable and wireless (e.g. cellular) communication networks to allow users to use a single mobile phone everywhere. Users are connected to the communication networks through public base stations when they travel on the road and are connected through personal base stations when they enter residential areas, e.g., their own homes or friends' and relatives' homes, where they are provisioned to make phone calls from. The system integrates a cellular or wireless communication network including at least one public base station with a cable communication network including at least one distribution hub, and the subtending hybrid fiber-coaxial (HFC) network and CPE, connected to the wireless communication network to provide telephone service.

In one aspect of the invention, the system comprises an interface unit operative to provide an air interface to the cable communication network and a handset unit operative to select one of a first communication channel for communication through the interface unit and a second communication channel for communication through the public wireless network.

A primary advantage of the present invention is that cable telephony and cellular/wireless access is unified, resulting in a single, reliable phone service for users that presently subscribe to a variety of services.

Advantages of the invention from the perspective of the cable service provider include increased mobility and a form of "life-line" capability for its telephony services. From the perspective of the cellular/wireless provider, advantages include improved quality of voice and data services, extended coverage area, and conservation of bandwidth.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIGS. 4(a)–(c) illustrate embodiments of the present invention;

DETAILED DESCRIPTION OF THE PREFERRED EMBODIMENTS

Figure 1:
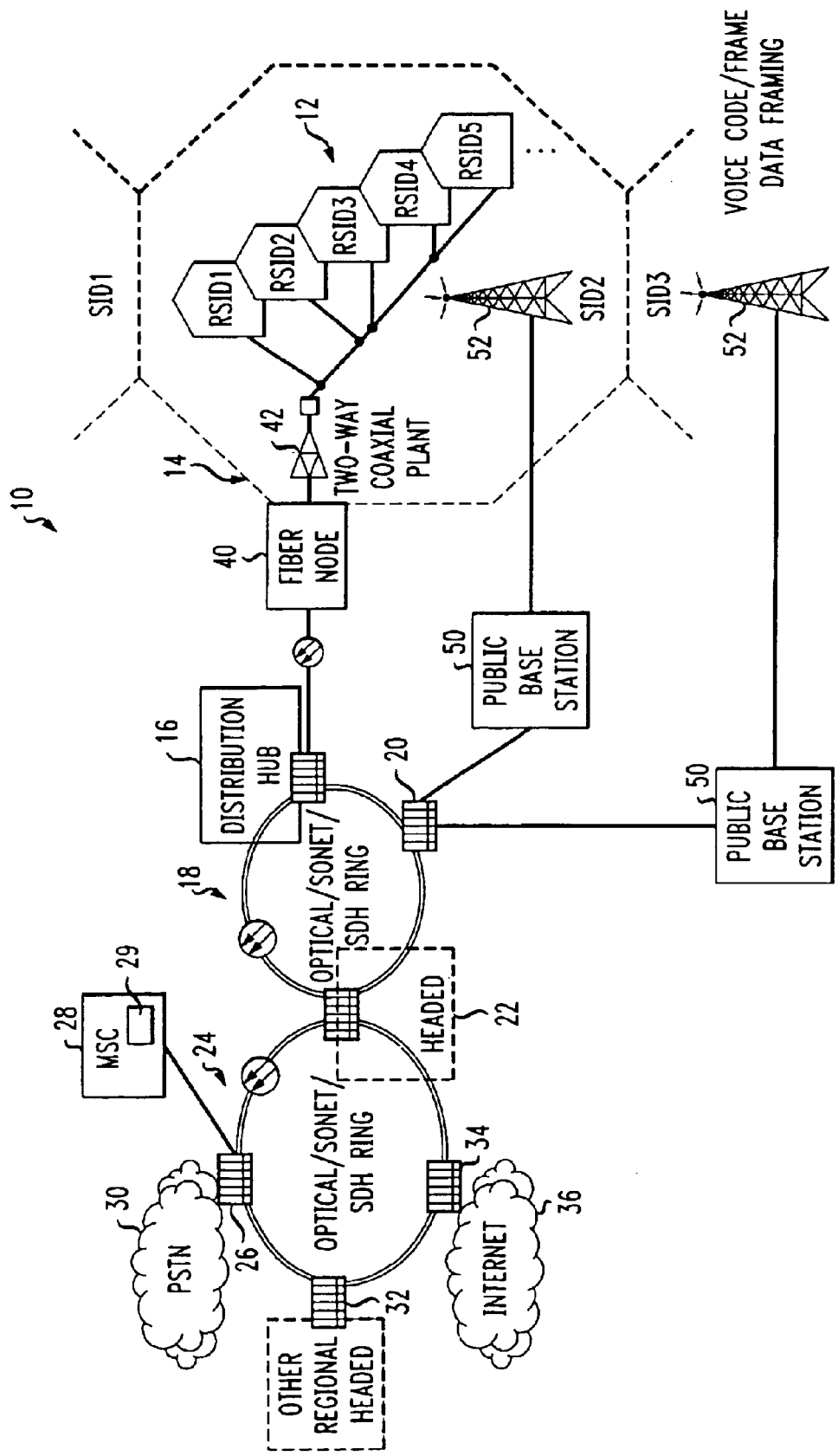
FIG. 1 is a schematic view of an exemplary network which incorporates the system according to the present invention.

Referring now to the drawings wherein the showings are for purposes of illustrating preferred embodiments of the invention only and not for purposes of limiting same, FIG. 1 provides a schematic view of an exemplary network to which the overall preferred system according to the present invention is applied. As shown, a network 10 includes a plurality of residences or homes 12 connected a via a hybrid fiber coaxial (HFC) link 14 to a distribution hub 16. The distribution hub 16 is a component of a cable communication network 18 that may take a variety of well-known forms but, as shown, is an optical network, synchronous optical network (SONET), synchronous digital network (SDH) or analog radio frequency (RF) ring network and includes another distribution hub 20 and a headend 22. The headend 22 connects the network 18 to another similar network 24, which as shown is also an optical/USONET/SDH/analog RF ring network. The network 24, like the network 18, may take a variety of well-known forms but, as shown, includes a distribution hub 26 connecting to a mobile switching center (MSC) 28 and a publicly switched telephone network (PSTN) 30. The network 24 may also include, as examples, another headend connection 32 and still another headend 34 for connection to the Internet 36.

The HFC link 14 advantageously incorporates a fiber node 40 and a two-way coaxial plant 42. In addition, the distribution hub 20 is preferably connected to public wireless base stations 50 that have respective antennas 52 connected thereto. Of course, it is to be appreciated that the base stations 50 may be incorporated into the network in a variety of ways that are well known in the art. For example, as shown, the base stations are directly linked to the distribution hub 20 but, alternatively, these base stations may be indirectly linked to the network. It should be further appreciated that a distribution network may be defined in the network 10 as providing connectivity between the cable communication network and the wireless communication network. The distribution network may take a variety of forms depending on the system but typically includes portions of the cable and wireless networks that provide the desired connectivity.

In addition, the network according to the present invention has provided thereto a database structure, as preferably shown at 29 in the MSC 28, that is used to store user information that is useful for identification and tracking of users. Preferably, such database structures are located as shown; however, the location may vary depending on the precise configuration of the network. Indeed, it is known to utilize database structures in wireless, communication networks, however, according to the present invention, the known databases are modified to accommodate the features thereof, as will be more particularly detailed below.

Figure 2:
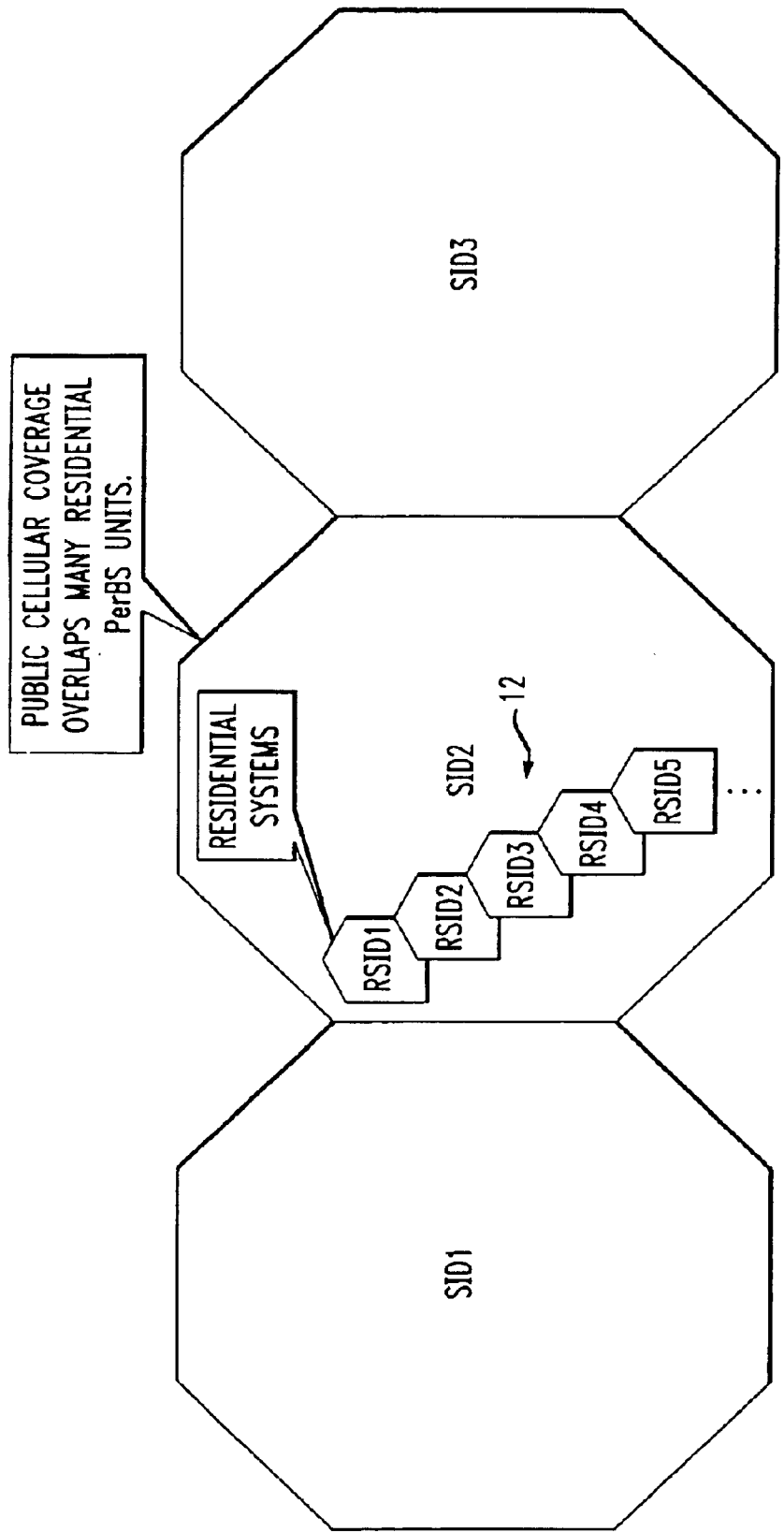
FIG. 2 is an illustration showing allocation of system IDs according to the present invention.

Referring now to FIG. 2 (and with continuing reference to FIG. 1), it can be seen that the network 10 as shown in FIG. 1 is distributed among components that are located in any one of a plurality of zones defining wireless coverage. Each such zone has assigned thereto a unique public system identification code, such as SID1, SID2 and SID3. In addition, each home or residence, such as those shown at 12, has a residential system identification code, i.e. RSID 1, RSID2, ... etc., assigned thereto. It is to be appreciated that public wireless coverage over a single public zone typically encompasses a plurality of the residential zones or systems.

Figure 3:
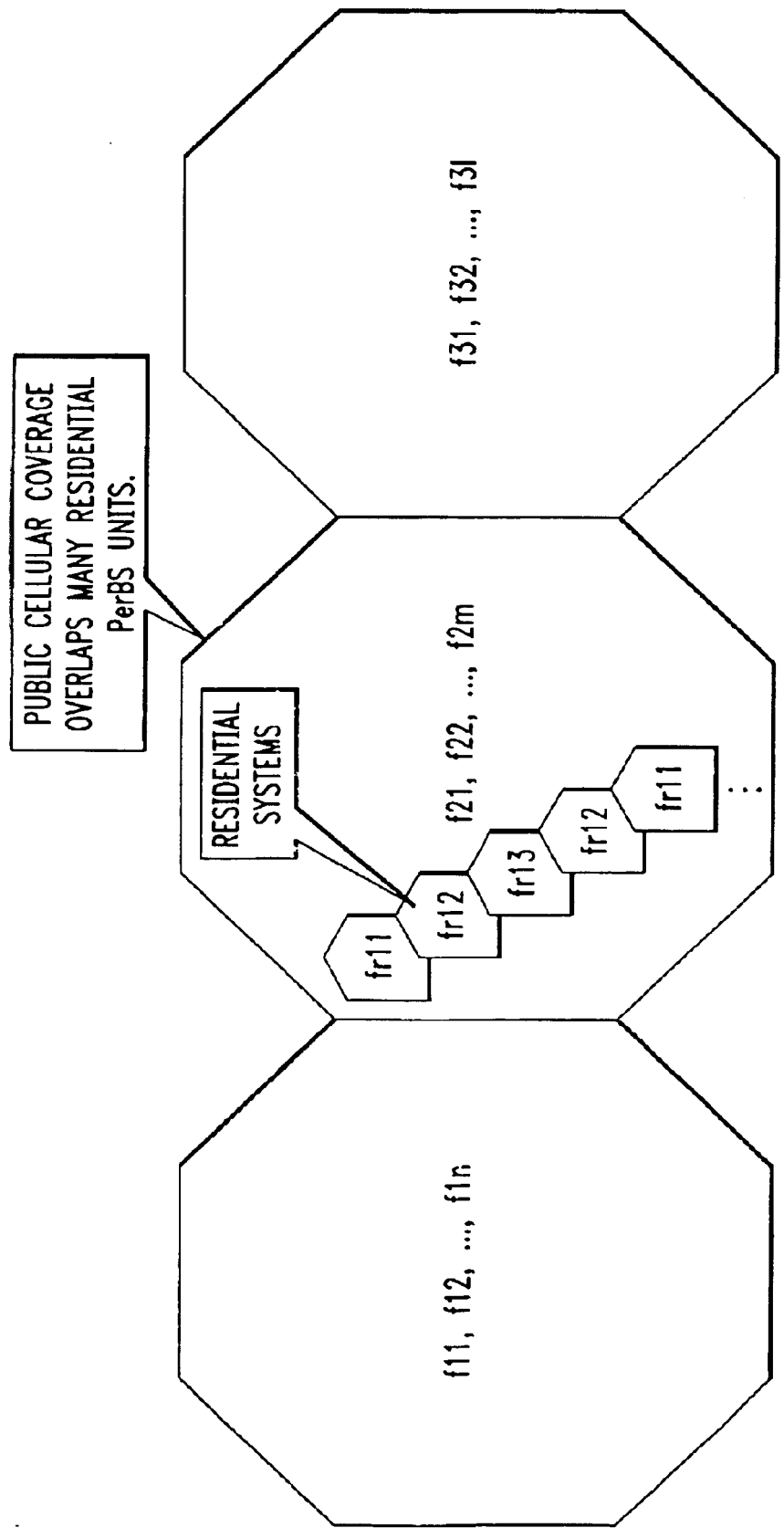
FIG. 3 is an illustration showing allocation of communication channels according to the present invention.

With reference to FIG. 3, it is to be recognized that the public wireless zones actually correspond to particular sets of frequencies, or communication, channels. For example, the zone identified by SID1 is assigned a set of channels, f11, f12, ..., f1n. The zone identified by SID2 is assigned a set of channels, f21, f22. ..., f2m. The plurality of residential zones, identified by RSID1, RSID2, ... etc, are assigned frequencies from a set of channels fr11, fr12, ..., fr1p. Note that, in FIG. 3 the possibility of frequency reuse among the residential systems is shown. It should be recognized that a variety of schemes to maintain separation between public channels and residential channels are available. Alternatively, channels may be dynamically assigned and controlled if both public and residential system operators are the same and the public system and residential system are tightly coupled. It is also important to note that the channels assigned to the adjacent cells of SID2 can be reused by the RSIDs located inside of SID2 coverage area, thus providing higher bandwidth efficiency.

Certain features of the network, e.g. public system and residential system identification codes, discussed in connection with FIGS. 2 and 3 are presently contemplated by the time division multiple access (TDMA) standard. That is, the concepts of a public system identification (SID) code, a private system identification (PSID) code—which (although not specifically discussed in connection with FIGS. 2 and 3) would be operative to service, for example, a building or campus, and a residential system identification (RSID) code are provided for by present TDMA standards. Indeed, wireless telephones manufactured under these standards typically include registers to store the codes and corresponding logic to effect hand-off between these systems. However, in these phones, the functions associated with distinguishing between different systems, e.g. public system, private system, or residential system, are simply not activated for purposes of allocating bandwidth on the available frequency spectrum. Therefore, the present invention finds particular advantageous application using such phones. It should be noted that the present invention also applies to other access and coding schemes, such as CDMA.

According to the present invention, the user is able to use a single phone for both mobile and residential purposes.

Preferably, if a user is in his/her residence, i.e. in his/her own residential system where access to the user's personal base station system (as will be described hereafter) is allowed, or in another residence, i.e. in another residential system in which the user is allowed to be connected through a personal base station in that residence, the phone will register onto that residential system using its RSIDs, notwithstanding the presence of a public system. According to the present invention, the RSIDs have the highest priority for registration. The mobile phone handset will only select the public system using a SID if the phone is located outside the coverage of its assigned RSIDs.

It is to be appreciated that information on RSIDs, PSIDs and SIDs is stored in the database structure noted above. Database entries corresponding to these identification codes facilitate the association of users with appropriate codes for purposes of registration, identification and tracking. Database entries are also provided to allow multiple users to register onto a single residential system. For example, a user residing within a residential system may permit friends, family, etc. to register onto his/her residential system if the friend/family member is in the residence.

Figure 4A:
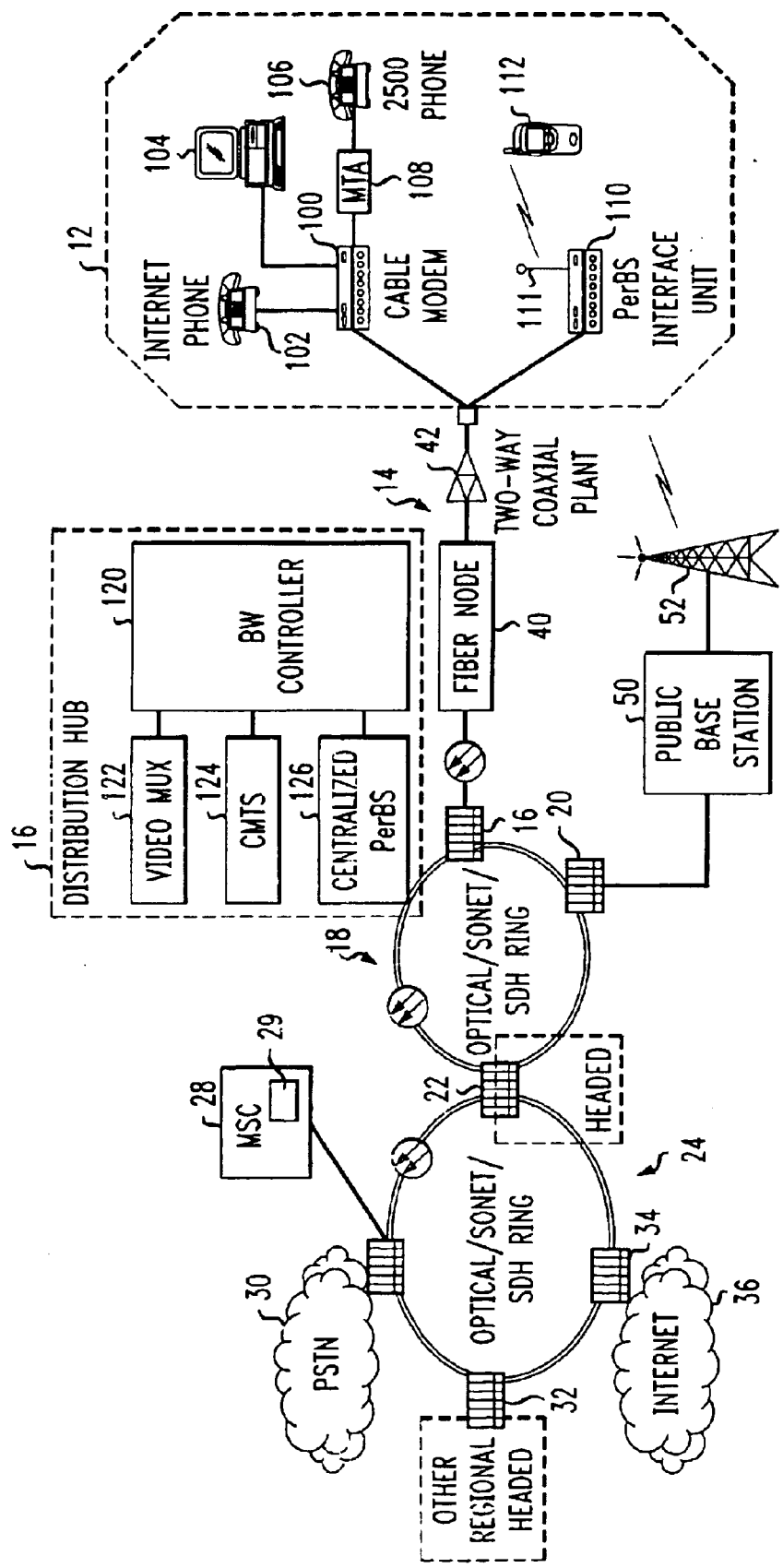

With reference now to FIG. 4(a), at least one of the residences 12 of FIG. 1 is shown in more detail, for example, as being equipped with a cable modem 100 that connects an internet phone 102, a computer 104, and a phone 106 (through a multimedia terminal adapter (MTA) 108 that provides telephone, and other services) to the cable system through the HFC link 14. In addition, a personal base station interface unit 110 having an antenna 111 is connected to the cable system. It should be appreciated that the cable modem 100 and the base station interface unit 110 may be separate units or a single unit.

The interface unit 110 is capable of facilitating communication between a handset unit 112 and the cable communication network 18 through an air interface via the antenna 111. It should be appreciated that, in this embodiment, the interface unit 110 comprises a "front end" of an overall personal base station system. The "back end" of the personal base station system, as will be described below, is located in distribution hub 16 and preferably serves a plurality of "front end" interface units. In this embodiment, the output of the "back-end" provides a digital interface with the distribution network, which may take a variety of forms. The "back-end" may also be located in a head end of the network if the configuration so dictates.

Other components of FIG. 4(a) generally reflect those shown in FIG. 1. More specifically, referring now to FIG. 4(b), the general structure of the database 29 that is preferably included in the mobile switching center 28 is shown. The database 29 is a home location register-user database and, according to the present invention, includes public network data, private network data, and residential network data, and functions to facilitate location and tracking of users for purposes of registration. As shown, the public network data 429 includes system identification codes (SIDS) and electronic serial numbers (ESNs)for "home" users. If a user registers in this particular location but has a different home location, then the home base of the user is contacted using the SID information output by the user's phone. It should be appreciated that subscriber identity modular (SIM) cards are also accommodated by the database, as well as wireless application platform (WAP) devices that have only data (no voice) functions, as shown in the figure. The SIMs devices utilize identification codes (SIMIDs) and the WAP devices likewise utilize electronic identification numbers (EIN) and Internet protocol (IP) information in the registration process.

Private network information 430 includes, for example, PSID 1, PSID 2, PSID 3, PSID 4, PSID 5 wherein each PSID is associated with the SID of the surrounding public network. Residential network data 431 includes, for example, RSID 1, RSID 2, RSID 3, RSID 4, RSID 5 wherein each RSID is associated with the SID of the surrounding public network.

As further shown, combinations that are acceptable to register using this database are a match of any SID, PSID, or RSID. If only PSIDs or RSIDs match, information about the surrounding SID is forwarded to the appropriate location, as those skilled in the art will appreciate.

In operation, and as will be described in further detail below, the handset unit, which is preferably a wireless or cellular phone, selects a frequency channel, under the control of logic and software implemented therein, for registration based on its location and the identification codes stored therein. For example, if the mobile phone is in the residence of the user, i.e. in the residential system occupied by the interface unit 110, the phone selects a first communication channel for communication through the interface unit. However, if the handset is not located in the residential system but is instead located in a public zone, the handset selects a second communication channel for communication through a corresponding public base station.

In these circumstances, the residential system has the highest priority for the mobile phone. This highest priority is maintained even though, from a simple power standpoint, the signal for the public system will be stronger than the residential signal. Accordingly, the mobile phone is preferably programmed to select the residential communication channel when the phone is in a sufficiently close proximity to the interface unit, regardless of the amplitude of the public system signal. However, when the phone is located away from the interface unit, the public system communication channels are selected. This is accomplished through manipulation of the stored identification codes and suitable logic and/or programming. Modifications to current wireless phone technology to accommodate this hierarchy of registration could be accomplished as well.

Of course, it should be appreciated that, if the interface unit is inoperative in the residential system, for example, in the case of local power outage, the handset unit will simply select the second communication channel corresponding to the available public system in which the residence is located. This feature provides the desired "lifeline" capability that is absent from the cable telephone systems that exist today.

More particularly, with reference now to FIG. 4(c), the data structure and logic, i.e. the network access method, of the handset 112 is shown. As illustrated, the data structure includes public network information 450, private network information 451 and residential network information 452. The handset 112 also includes a memory structure and processing capability to store and implement logic and algorithm 453. The public network information 450 includes public system identification SID (inserted by service provider), electronic serial number (which is part of the phone), and, if appropriate, an identification code for a subscriber identity module SIMID, an electronic identification number (EIN) for a WAP device and an internet protocol (IP) code (inserted by a service provider). The private network information 451 includes PSID 1–PSID 5 in priority order. These numbers are inserted by the organization providing the private network, e.g. work places and the like. In addition, a subscriber identity module (SIM) card may be used to store this information. The residential network information 452 includes RSID 1–RSID 5 stored in priority order and inserted by the user or service provider to identify residences where the user may register. Likewise, a subscriber identity module (SIM) card may include this information.

The logic and algorithm 453 of the handset is as follows. The handset 12 first searches to determine if an RSID is available and, if it is, registers using the RSID. This search occurs in priority order. In this regard, the phone also broadcasts the surrounding SID. If no RSID match occurs, a search for a PSID is initiated. This search occurs in priority order. If found, by the handset, the phone is registered using that PSID. If a PSID match does not occur, then a search for a public SID is initiated. It should be noted that if a match occurs using any RSID or PSID, information about the surrounding public network is also provided by the handset.

With continuing reference to FIG. 4(a), as shown, the distribution hub 16 according to this embodiment will preferably include a bandwidth manager 120 that connects a video multiplexer 122, a cable modem termination system CMTS 124, and a centralized personal base station device 126 that comprises the above-referenced "back-end" of the personal base station system that communicates with the "front-end" of the system, i.e. personal base station interface unit 110. It should be appreciated that the centralized base station device 126 will preferably serve a plurality of interface units in a plurality of residences,such as the one identified by 110. In addition, as noted above, the "back-end" could alternatively be located in a head end unit.

Figure 5A:
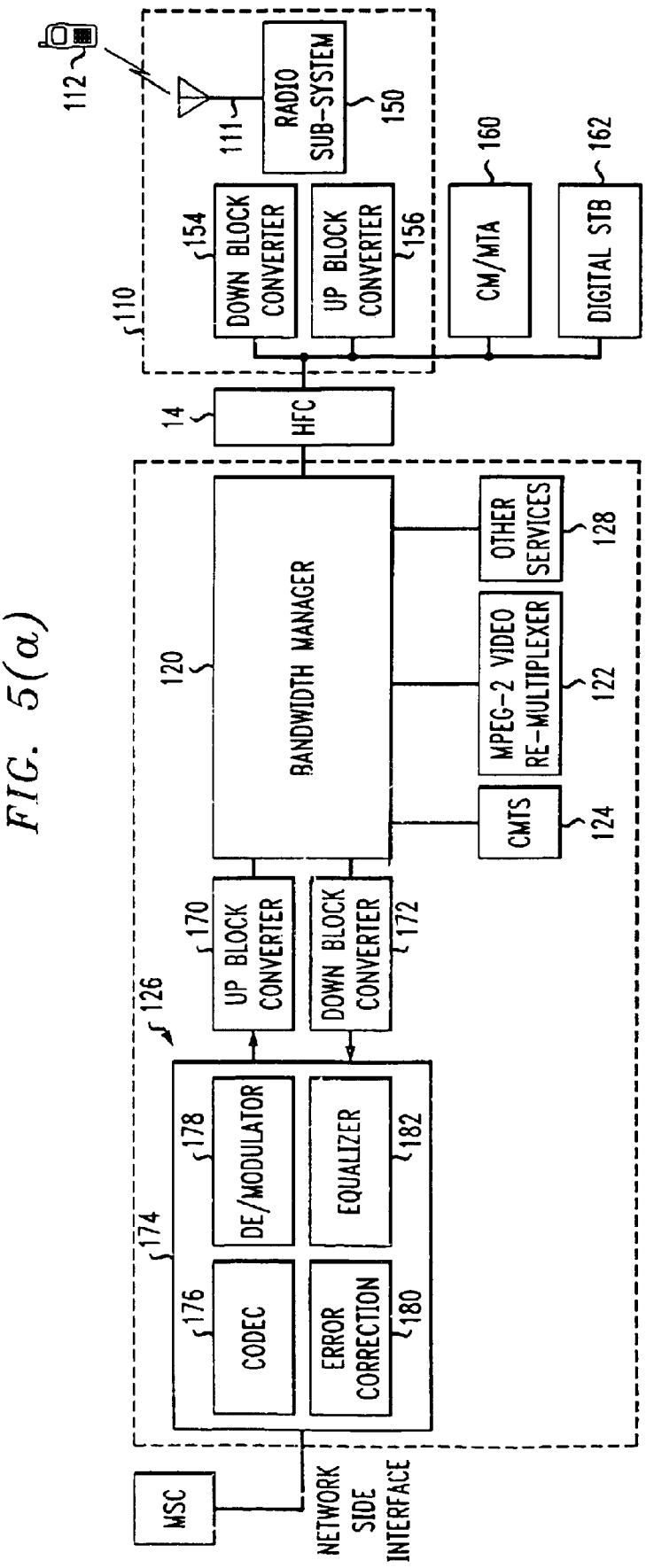
FIGS. 5(a)–(b) illustrate alternative embodiments of a personal base station system according to the present invention.

More particularly, as shown in FIG. 5(a), the personal base station interface unit 110 shown in FIG. 4 includes a radio subsystem 150 with the antenna 111 extending therefrom. Also included in the front-end of the personal base station system is a down block converter 154 and an up block converter 156 for effective communication on the HFC link 14. The front end of the personal base station system makes use of the air interface between the antenna 111 and the hand set unit, or mobile phone, 112 to establish communication between the phone and the personal base station system. The converters 154 and 156 facilitate block conversions to allow for communication between cellular/wireless frequency bands and available bandwidth on the cable system. If the personal base station interface unit 110, the central base station device 126, and the bandwidth manager 120 are loosely coupled, i.e., without real-time communication and coordination, a fixed block of the available spectrum on the cable system may be assigned thereto. However, if the personal base station interface unit 10, the centralized base station 126, and the bandwidth manager 120 are tightly coupled, a dynamic spectrum assignment is possible, allowing integrated spectrum management.

Preferably, the personal base station interface unit 10 is assigned a limited amount of cable bandwidth for service. For example, 2×30 KHz in each direction may be assigned. Integrated bandwidth management can then be accomplished by the cable bandwidth manager 120, which can dynamically adjust bandwidth allocation according to traffic demand, as those of skill in the art will appreciate. With this arrangement, a group of personal base station interface units such as that designated by 110 can share a certain number of 30 KHz channels. The actual bandwidth assignment would depend on network topology, traffic demand, available cable bandwidth, available bandwidth over an air interface, . . . etc. Preferably, the frequency assignments would be accomplished in such a way to provide best possible quality and maximized efficiency.

As to the mobile phones 112, such units would be assigned channels over the air interface according to particular standards. These mobile phones could be provisioned with a single RSID or multiple RSIDs in a priority order, as shown in FIG. 4(c). Of course, these RSIDs would be stored in an appropriate register or location with the phone 112. If a single RSID is provisioned, the user would be considered "roaming" when making phone calls from other houses provisioned with different RSIDs, authorized through Visiting Location Register (VLR). If multiple RSIDs are provisioned, a user would be considered to be calling from "home" when making phone calls from other houses provisioned with different RSIDs if authorized through Home Location Register (HLR). Another alternative for assigning channels to mobile phones 112 is to simply assign cordless standard when the user is inside his/her own household.

As described above, the bandwidth manager 120 is connected to the centralized base station device 126, or the "back-end. In this regard, the bandwidth manager is connected to an up block converter 170 and a down block converter 172 which have a similar function as the converters 154 and 156. The bandwidth manager determines optimal allocation of cable bandwidth to a variety services (data, digital video, etc.) that coexist on the same HFC infrastructure. The bandwidth manager then instructs the two up/down converter pairs, one pair 170, 172 in the distribution hub and the other pair 154, 156 in the residence, to translate wireless frequency allocation to and from cable frequency allocation. In addition, the centralized base station 126 also includes an air interface signal processing module 174 having therein a codec (i.e. encoder/decoder) 176, modulator/demodulator 178, error detection/correction circuitry 180 and an equalizer 182. The form and function of these components are well known to those skilled in the field. As noted above, the centralized base station device 126 may be shared by a group of households at a variety of RSID levels, e.g. a group of RSIDs or a group of a group of RSIDs. One of the primary functions of the central base station device 126 is to interconnect with a cellular local transport network through the distribution hub, or head end, depending on the specific needs in the geographic area.

In operation, the handset unit 112 provides an analog signal to the radio subsystem 150 through the antenna 111. The analog signal is appropriately moved along the frequency spectrum by the converters 154/156 so that transmission along the HFC link 14 can be accommodated. The bandwidth manager 120 receives the analog signal, which is then again moved on the frequency spectrum by the converters 170/172. The air interface signal processing module 174 then processes and manages the analog signal by, among other functions, converting the signal to a digital signal to be presented to the distribution network at the output of the module 174.

As an alternative to the personal base station system that includes a "front-end" such as the interface unit 110 and a "back end" that includes the centralized base station 126, a single, complete personal base station system that accomplishes all of the functionality of the front end and back end of the prior described system may be implemented. That is, instead of having an interface unit 110 in a residence communicating with a centralized base station device 126 in a distribution hub to accomplish the logic and circuitry of the system of the present invention, each residence is alternatively equipped with a complete personal base station that accomplishes these tasks. The implementation of such a system depends largely on the local cable/cellular environment. Importantly, though, it should be recognized that a personal base station of this nature would preferably use digital transmission techniques to provide communication over the cable network. In this regard, the complete personal base station would include a variety of modules that are well known to those skilled in the art to facilitate this feature but, preferably, takes a form to include components such as the air interface signal processing module 74 of FIG. 5(*a*). In this configuration, the interface unit provides a digital interface to distribution network which, in this embodiment, begins at the HFC link.

Figure 5B:
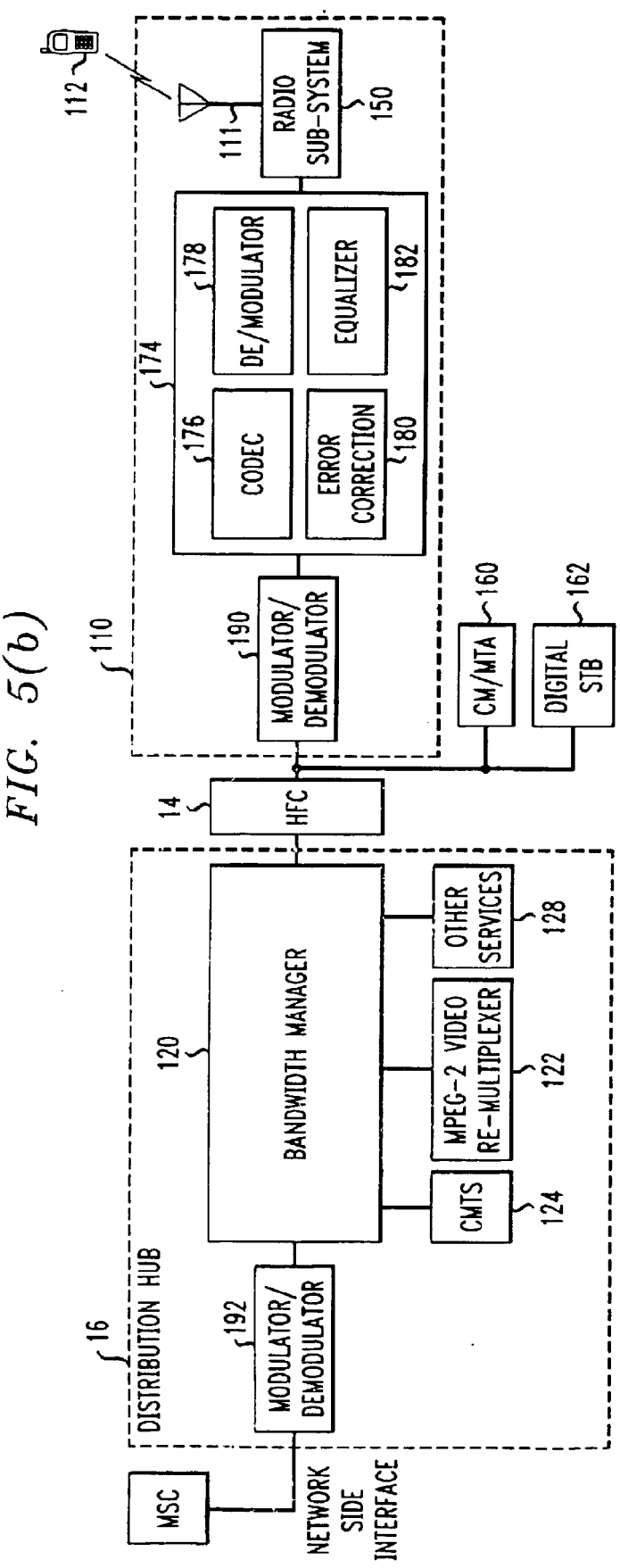

Referring now to FIG. 5(*b*), a complete personal base station system of this type is illustrated. As shown, the personal base station 110 includes a radio subsystem 150 with the antenna 111 extending therefrom. Also included in the personal base station 10 in this embodiment is the air interface signal processing module 174 which includes a codec 176, a modulator demodulator 178, an error correction circuit 180, and an equalizer 182. This module 174, in the previously described embodiment, is a part of the centralized back end of the base station 126. Connected to the module 174 is a cable modulator demodulator 190 that communicates with the HFC link 14.

As noted above, the module 174 is located within the personal base station 110 so there is no need for a centralized back end comprising the module 174. Therefore, the distribution hub 16 in this embodiment includes a bandwidth manager 120, connected to a, cable modulator demodulator 192. Also connected to the bandwidth manager are CMTS 124, video remultiplexer 122, and other service routines 128. It should be noted that, in this embodiment, the block converters 154, 156, 170, and 172 are no longer necessary to effect communication between the personal base station and the cable system.

It will be apparent to those skilled in the art that the embodiment illustrated in FIG. 5(*b*) would simply replace the embodiment illustrated in FIG. 5(*a*) in the network shown in FIG. 4. Of course, this means that the distribution hub and the personal base station 110 illustrated in FIG. 4 would resemble that of FIG. 5(*b*) instead of that of FIG. 5(*a*).

In operation, a handset unit 12 provides an analog signal that is received by the radio subsystem 150 through the antenna 111. The air interface signal processing module 174 then processes and manages the analog signal by, among other functions, converting the analog signal to a digital signal to be output by the module 174. This digital signal is then converted to a digitally modulated analog signal by using a modulation scheme (e.g. Quadrative Phase Shift Keying modulation) in the modulator/demodulator 190. It is to be appreciated that the modulator/demodulator 190 is included within the cable modem. The digitally modulated analog signal is carried on the RFC link 14 to the bandwidth manager 120. At this point, the signal is in the analog domain. The modulator/demodulator 192, which forms a part of the CMTS 124, then converts the signal to a purely digital signal for presentation to the rest of the network. In this embodiment, a distribution network, which may take a variety of forms, actually begins at the HFC link 14.

Implementation of the present invention preferably includes providing methods for registration/authentication/authorization, for originating/terminating calls, and for handoffs between the residential systems and the public systems. These methods are implemented to allow for convenient operation of the invention for the user. For example, the user should be able to originate a call from any location through any of the available systems. Further, once a call is active, the user should be able to experience a seamless transition when the mobile phone being used is transported between systems, e.g. between residential systems and the public system.

An advantageous feature of the present invention is the programming of the phones so that the RSID stored therein is used in a manner to perform registration in a hierarchical manner. That is, if the phone is able to register on an available and appropriate residential system, it will do so irrespective of whether a public system signal may be stronger. The RSIDs have priority over all other identification codes in the phone. This was described in connection with FIG. 4(*c*) and is illustratively shown in FIGS. 7–9 by the flow diagrams comprised of the diamond-shaped blocks. Using FIG. 7 as an example, suitable programming steps would include first determining if an RSID match occurs (step 750). If not, it is determined whether a PSID match occurs (step 752). Last, the phone attempts to lock on to a public system using its SID (step 754). Again, this hierarchy of registration is accomplished irrespective of whether the power of the public system is higher than the residential system at issue.

It is to be appreciated that these methods, as well as others described herein, are implemented using a variety of software, hardware, and logic techniques that will be apparent to those skilled in the art upon a reading of this specification. Of course, it is to be further appreciated that these techniques may vary from one implementation to the next but still fall within the scope of the invention.

Figure 6:
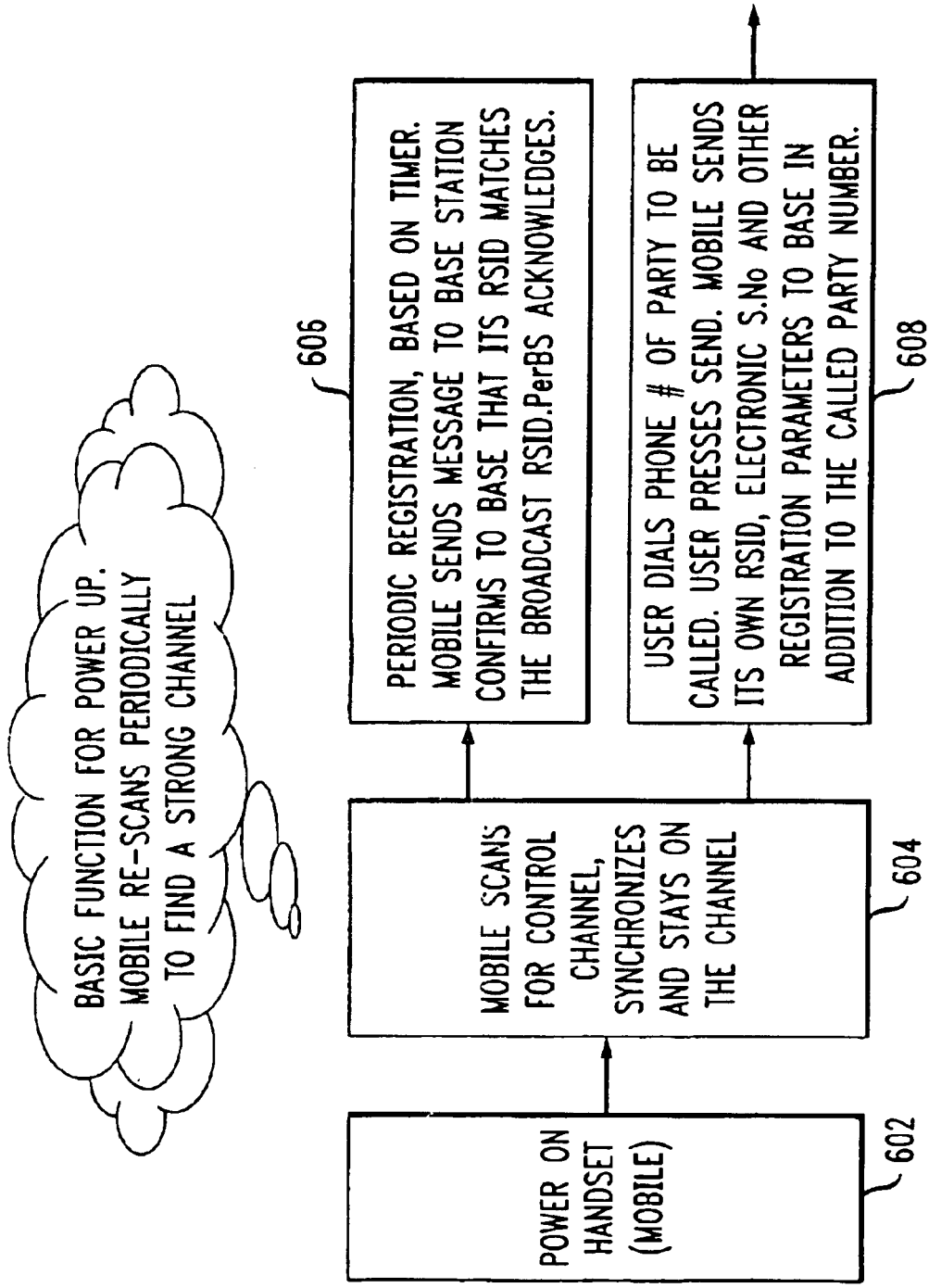
FIGS. 6 and 7 are flow charts illustrating the steps for a call originating with a mobile phone according to the present invention.

Registration and authentication are preferably implemented using known standards as those skilled in the art will appreciate. As to call origination, however, with reference to FIGS. 6 and 7, a voice call originating with the mobile phone, or handset unit, 112 in a residential system or a public system and connecting to a circuit switch network, e.g. PSTN network, is described. As shown, the power for the handset 112 is turned on (step 602). The mobile phone then scans for a control channel, performs synchronizing functions, and stays on the selected channel (step 604). Periodic registration, based on a timer, is performed (step 606). In this regard, the mobile phone sends a message to the personal base station to confirm that its RSID matches the assigned, or broadcast, RSID, if the phone is located within a residential system at the time of registration. If a call is originated, the user dials the phone number of the party to be called and presses send (step 608). The mobile phone sends its own RSID, electronic serial number, and other registration perimeters to the base station in addition to the number of the party to be called.

Figure 7:
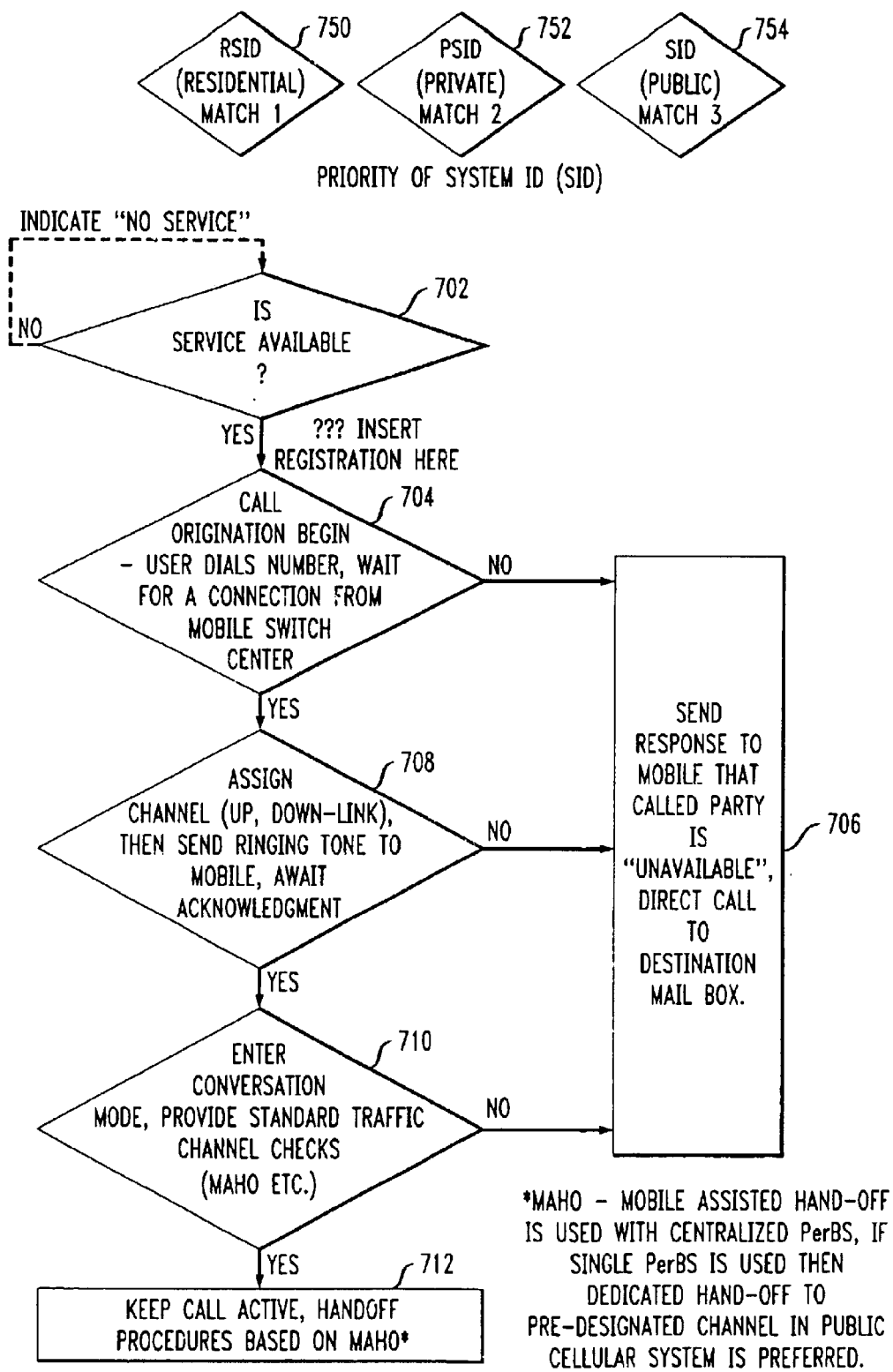

Referring now to FIG. 7, if no service is available, the system simply continues to scan to find service (step 702). If service is available, call origination begins (step 704). The user awaits connection from a mobile switching center. If no connection is established, a response is sent to the mobile phone 112 that the called party is unavailable and the call is directed to a destination mailbox (step 706). If, however, a connection is made to a mobile switching center, a channel is assigned and then a ringing tone is sent to the mobile phone 112 to await acknowledgement (step 708). If no acknowledgement is received, step 706 is repeated. If, however, acknowledgement is received, conversation is initiated and traffic channel checks are initiated (step 710). If the call is terminated as a result of these checks, step 706 is repeated. If there is no termination, the call remains active (step 712).

Figure 8:
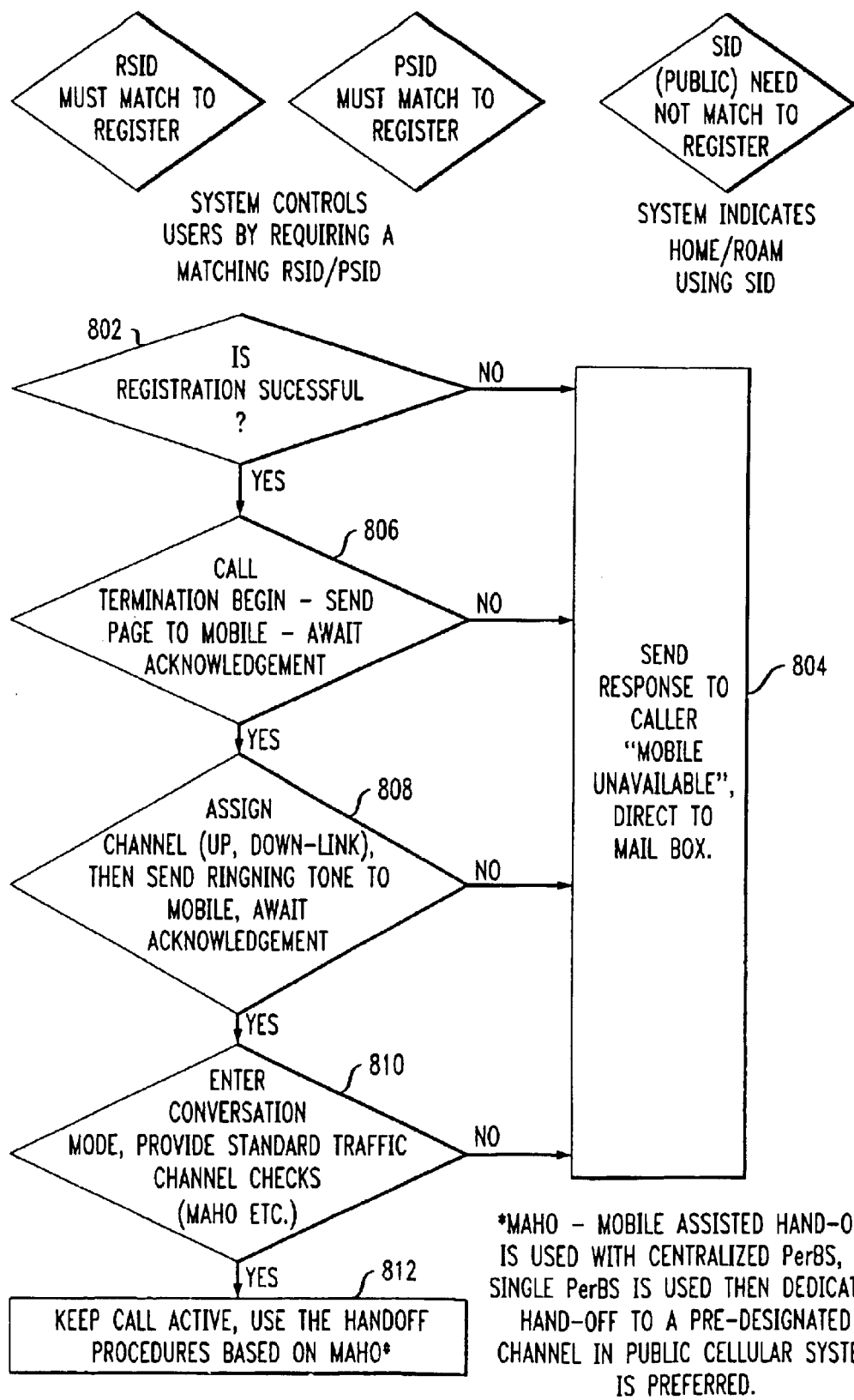
FIG. 8 is a flow chart illustrating the steps for a call according to the present invention whereby the mobile phone is the destination for the calls.

Referring now to FIG. 8, a method for a call terminating at the mobile phone is shown. First, a determination must be made as to whether the mobile unit is successfully registered (step 802). If not, the caller to the mobile phone receives a mobile unavailable message (step 804). If the mobile phone is successfully registered, the call begins (step 806). If, however, acknowledgement is received, a channel is assigned and a ringing tone is sent to the mobile to await acknowledgement (step 808). If no acknowledgement is received, step 806 is repeated. If acknowledgement is received, conversation is initiated and traffic control checks are initiated (step 810). If the call is then terminated, step 806 is repeated. If there is no termination, the call remains active (step 812).

Figure 9:
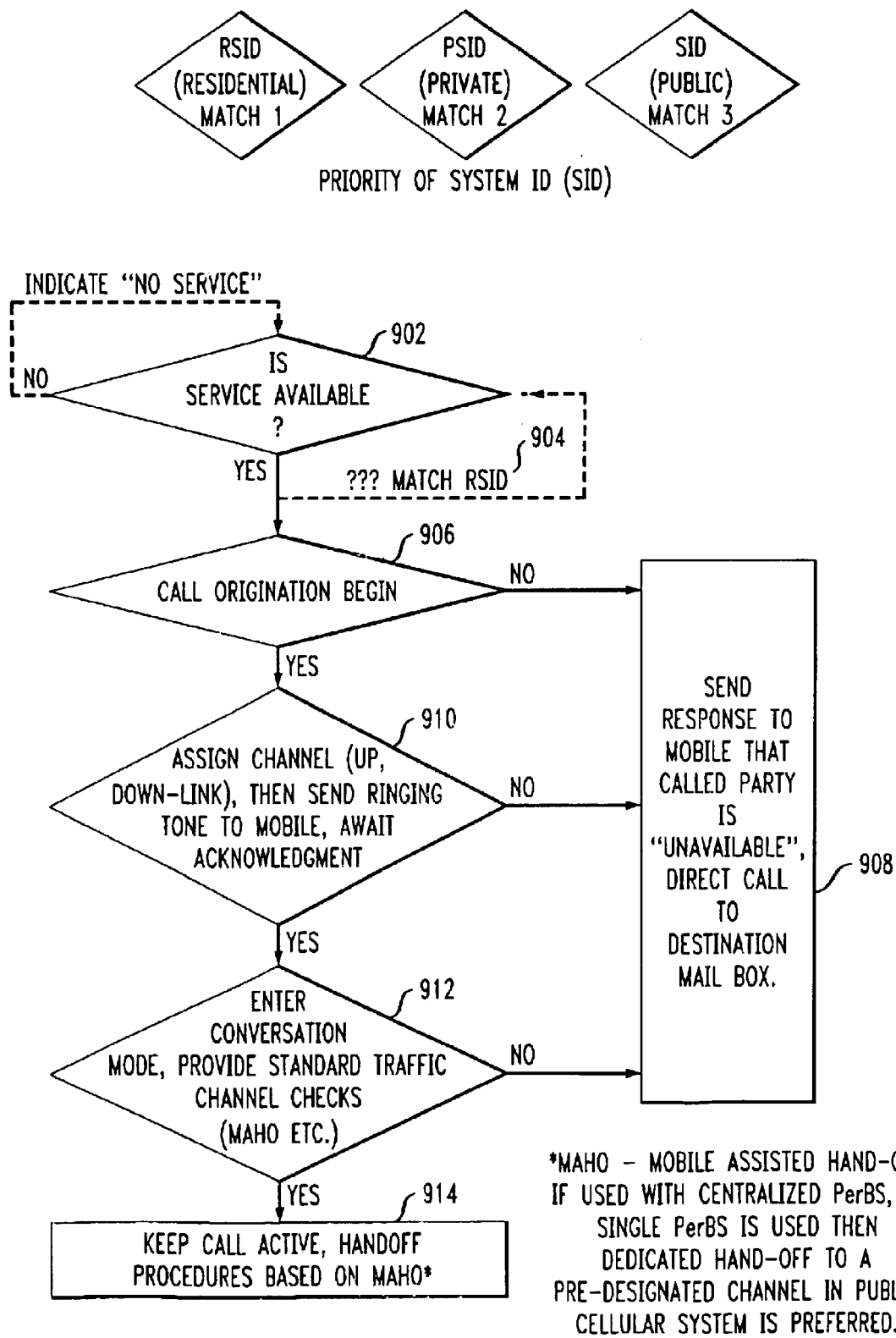
FIG. 9 is a flow chart illustrating a method for originating a call in the service area of the personal base station according to the present invention.

Referring now to FIG. 9, if a phone is powered "on" and a call is originated in the serving area of the personal base station interface unit, i.e. in the user residence, then a determination is first made as to whether service is available (step 902). Next, a determination is made whether there is a match of RSIDs (step 904). If so, call origination begins (step 906 . If no acknowledgement is received, the mobile phone is provided with a message indicating that the called party is unavailable. If an acknowledgement is received, a channel is assigned, a ringing tone sent to the mobile phone unit, and the acknowledgement awaited (step 910). If no acknowledgement is received, step 908 is repeated. However, if acknowledgement is received, conversation mode and standard traffic channel checks are initiated (step 912). If these checks are satisfactory, the call is kept active and handoff procedures are exercised (step 914).

Figure 10:
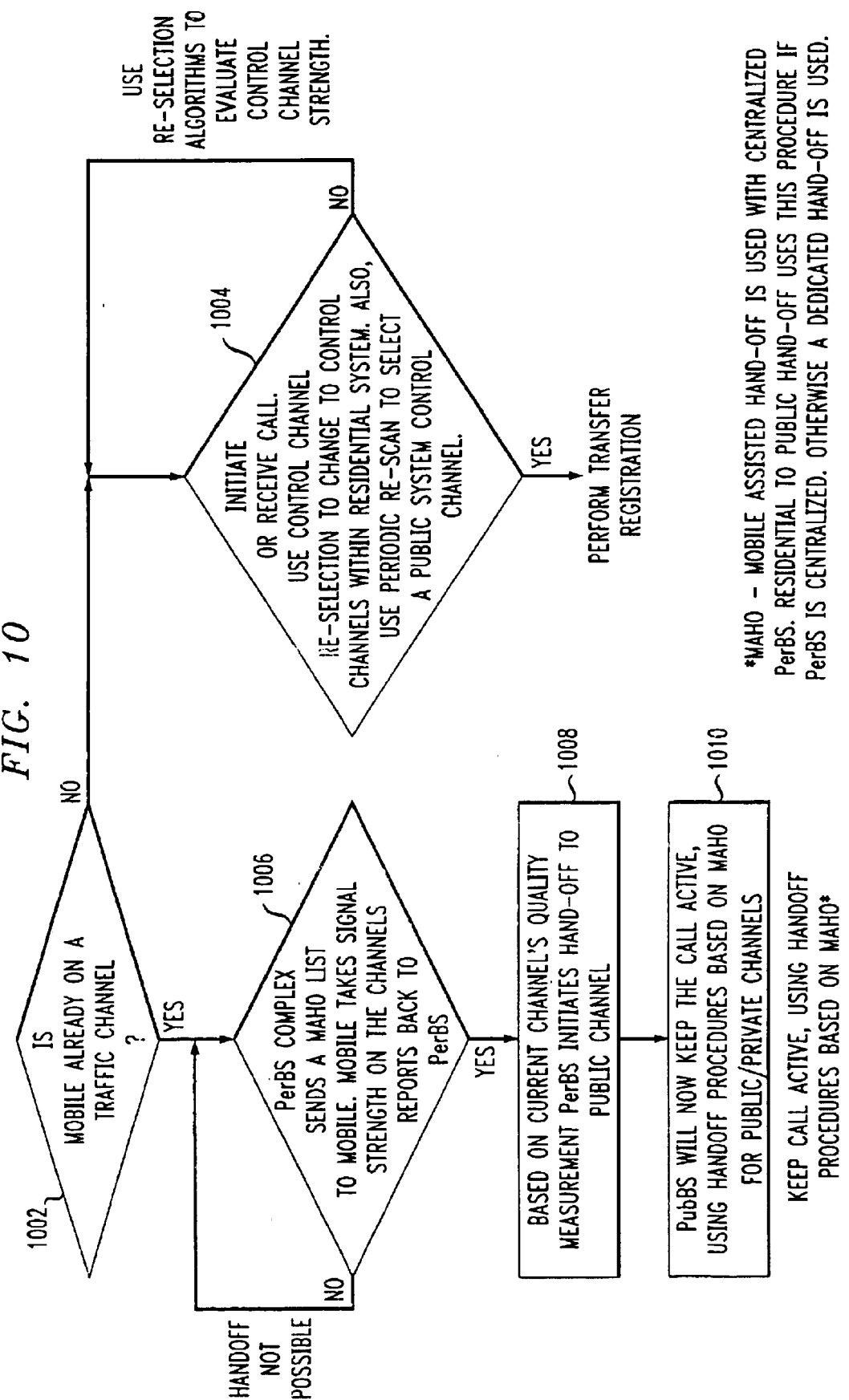
FIG. 10 is a flow chart illustrating a method for a hand-off from a residential system to a public wireless system; and, FIG. 11 is a flow chart illustrating a method for a hand-off from a residential system to a residential system.

With respect to these handoff procedures, FIG. 10 illustrates a hand-off from a residential system (e.g. personal base station) to the public wireless system. Initially, a determination is made as to whether the mobile phone is locked on to a traffic channel (step 1002). If not, channel reselection and rescanning is initiated to evaluate control channel strength (step 1004). If the mobile phone is on a traffic channel, the personal base station sends a handoff list to the mobile phone and the mobile phone checks the signal strength on the channels and reports back to the personal base station (step 1006). If no handoff is possible, the steps are repeated. If a handoff is possible, the personal base station initiates a handoff to the public channel based on the current channels quality measurement (step 1008). The public base station then maintains the call (step 1010).

Figure 11:
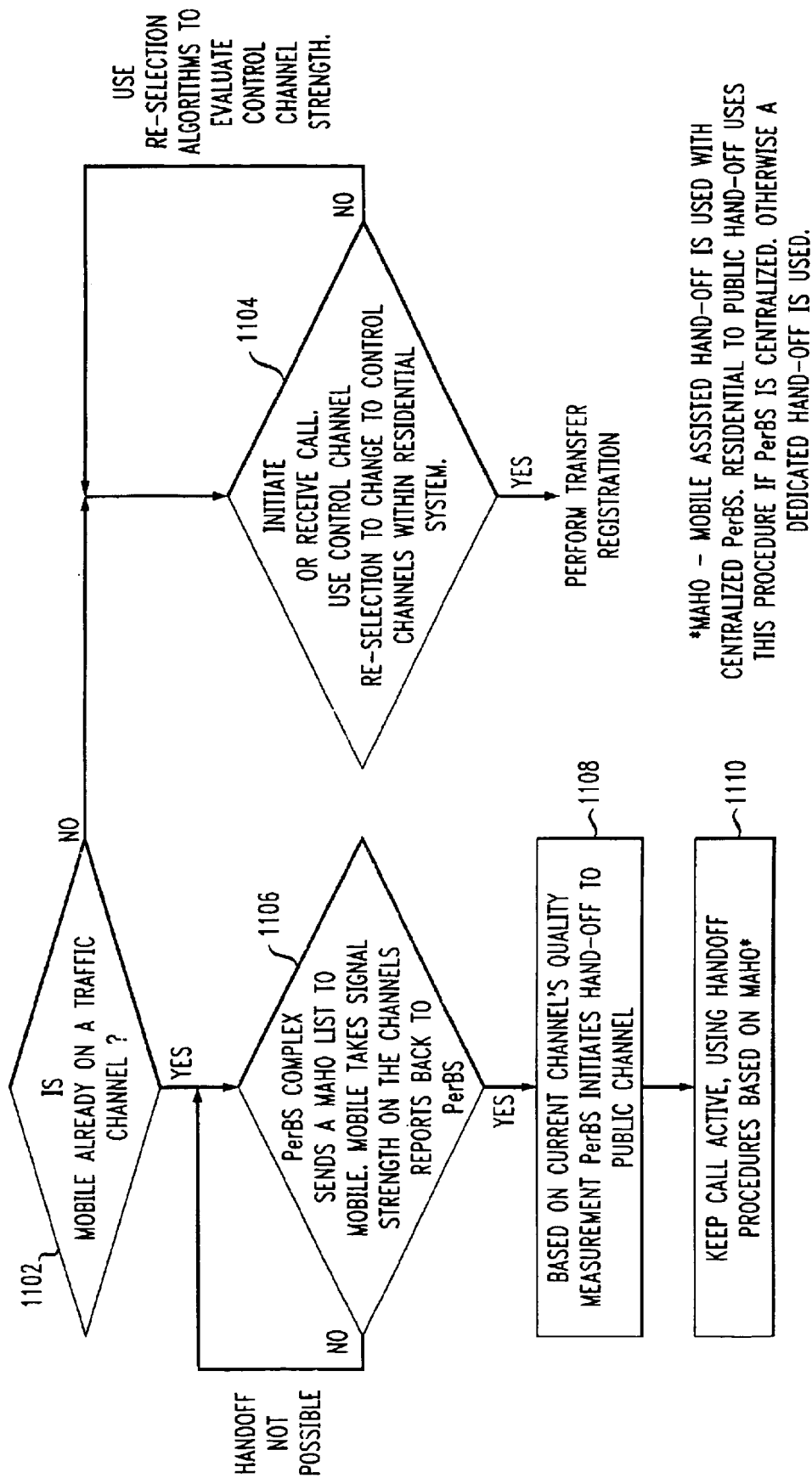

FIG. 11 illustrates a handoff from a residential system to a residential system. First, a determination is made whether the mobile unit is already on a traffic channel (step 1102). If not, reselection is initiated until registration is possible (step 1104). If the traffic channel is established, the personal base station sends a handoff list to the mobile unit and the mobile unit checks the signals strength on the channels and reports back to the personal base station (step 1106). If no handoff is possible, the steps are simply repeated. If a handoff is possible, the personal base station initiates a handoff to the selected channel (step 1108) and the call is maintained (step 1110).

It should be appreciated, as shown in the FIGS. 7–11, that Mobile Assisted Hand-Off (MAHO) is used when a centralized personal base station device (as in FIG. 5(*a*)) is implemented. Otherwise, a dedicated hand-off is used, as those of skill in the art will understand.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, we hereby claim:

1. A system for integrating a wireless communication network including at least one public base station with a cable communication network including at least one of a distribution hub and a head end connected to the wireless communication network to provide telephone service, a distribution network being defined that includes portions of the wireless communication network and the cable communication network, the system comprising:

a personal base station system operative to manage and process analog communication signals and provide a digital network interface to the distribution network, the personal base station system including an interface unit operative to provide an air interface to, the cable communication network;

a hand set unit operative to select one of a first communication channel for communication through the personal base station system to the cable communication network via the air interface provided by the interface unit and a second communication channel for communication through the at least one public base station to the wireless communication network, selection of the first communication channel or the second communication channel being based on information stored on the hand set, priority being given to the first communication channel; and, a data base structure positioned in one of the cable communication network and the wireless communication network and including identification data to facilitate communication through one of the first and second communication channels.

2. The system as set forth in claim 1 wherein the personal base station system includes modules located within the interface unit operative to transmit digital signals over the cable communication network.

3. The system as set forth in claim 1 wherein the personal base station interface unit includes a radio system operative to receive and transmit analog signals over the cable communication network.

4. The system as set forth in claim 3 further comprising modules located in one of the distribution hub and the head end operative to receive the analog signals and transmit corresponding digital signals.

5. The system as set forth in claim 1 wherein the handset has stored therein a residential system identification code and a public system identification code, which are reflected in the data base structure.

6. The system as set forth in claim 5 wherein the handset and data base structure are operative to select the first communication channel and the second communication channel based on the proximity and signal strength between the handset unit and the personal and public base stations.

7. The system as set forth in claim 5 wherein the handset and customer data base structure are operative to select communication through a public base station when a serving personal base station system is not operative.

8. The system as set forth in claim 1 wherein the identification data relates to registration, origination, termination, and handoff processes.

9. A system for integrating a wireless communication network including at least one public base station with a cable communication network including at least one of a distribution hub and a head end connected to the wireless communication network to provide telephone service, a distribution network being defined that includes portions of the wireless communication network and the cable communication network, the system comprising:

a personal base station system operative to manage and process analog communication signals and provide a digital network interface to the distribution network, the system including an interface unit to provide an interface to the cable communication network and a centralized personal base station device including an air interface signal processing module positioned in one of the distribution hub and the head end, the centralized personal base station device being operative to service a plurality of interface units;

a hand set unit operative to select one of a first communication channel for communication through the personal base station system to the cable communication network via the air interface provided by the interface unit and a second communication channel for communication through the at least one public base station to the wireless communication network, selection of the first communication channel or the second communication channel being based on information stored on the hand set, priority being given to the first communication channel; and, a data base structure positioned in the distribution network and including identification data to facilitate communication through one of the first and second communication channels.

10. The system as set forth in claim 9 wherein the interface unit comprises a radio subsystem having an antenna.

11. The system as set forth in claim 9 wherein the interface unit comprises frequency conversion devices connected to an HFC link.

12. The system as set forth in claim 9 wherein the centralized personal base station device further comprises frequency conversion devices connected to the air interface signal processing module.

13. The system as set forth in claim 12 wherein the air interface signal processing module comprises a codec, a modulator/demodulator, an error correction circuit, and an equalizer.

14. The system as set forth in claim 12 wherein the frequency conversion devices connect with a bandwidth manager that connects to an HFC link.

15. The system as set forth in claim 9 wherein the identification data relates to registration, origination, termination, and handoff processes.

16. A system for integrating a wireless communication network including at least one public base station with a cable communication network connected to the wireless communication network to provide telephone service, a distribution network being defined that includes portions of the wireless communication network and the cable communication network, the system comprising:

a personal base station system operative to manage and process analog communication signals and provide a digital network interface to the distribution network, the system including an interface unit to provide an interface to the cable communication network and an air interface signal processing module positioned in the interface unit to convert the analog signals to digital signals to be provided to the cable communication network and the distribution network;

a hand set unit operative to select one of a first communication channel for communication through the personal base station system to the cable communication network via the air interface provided by the interface unit and a second communication channel for communication through the at least one public base station to the wireless communication network, selection of the first communication channel or the second communication channel being based on information stored on the hand set, priority being given to the first communication channel; and, a data base structure in the distribution network and including identification data to facilitate communication through one of the first and second communication channels.

17. The system as set forth in claim 16 wherein the interface unit further comprises a radio subsystem having an antenna.

18. The system as set forth in claim 16 where in the air interface signal processing module comprises a module including a codec, a modulator/demodulator, an error correct circuit and an equalizer.

19. The system as set forth in claim 16 wherein the identification data relates to registration, origination, termination, and handoff processes.

20. A method for integrating cable and wireless communication networks to provide telephone service, the method comprising:

providing a first communication channel for communication through a personal base station via an air interface, the personal base station connecting to the cable communication network;

providing a database structure including identification data to facilitate communication through one of the first and a second communication channels; and, allowing communication through the second communication channel for communication through a public base station of the wireless communication network, wherein a selection of the first or second communication channel by a handset is based on proximity of the handset to the personal base station and on data stored in the hand set, priority being given to selection of the first communication channel by allowing the handset to select the first communication channel for registration if the handset is in a sufficiently close proximity to the personal base station and allowing the handset to select another communication channel including the second communication channel only if the first communication channel is not selected, whereby the first communication channel is selected without regard to amplitude of signals associated with the public base station of the second communication channel.

* * * * *